Feb. 20, 1934.    A. E. RUTTER    1,947,572
HAY RAKE
Filed Feb. 17, 1933
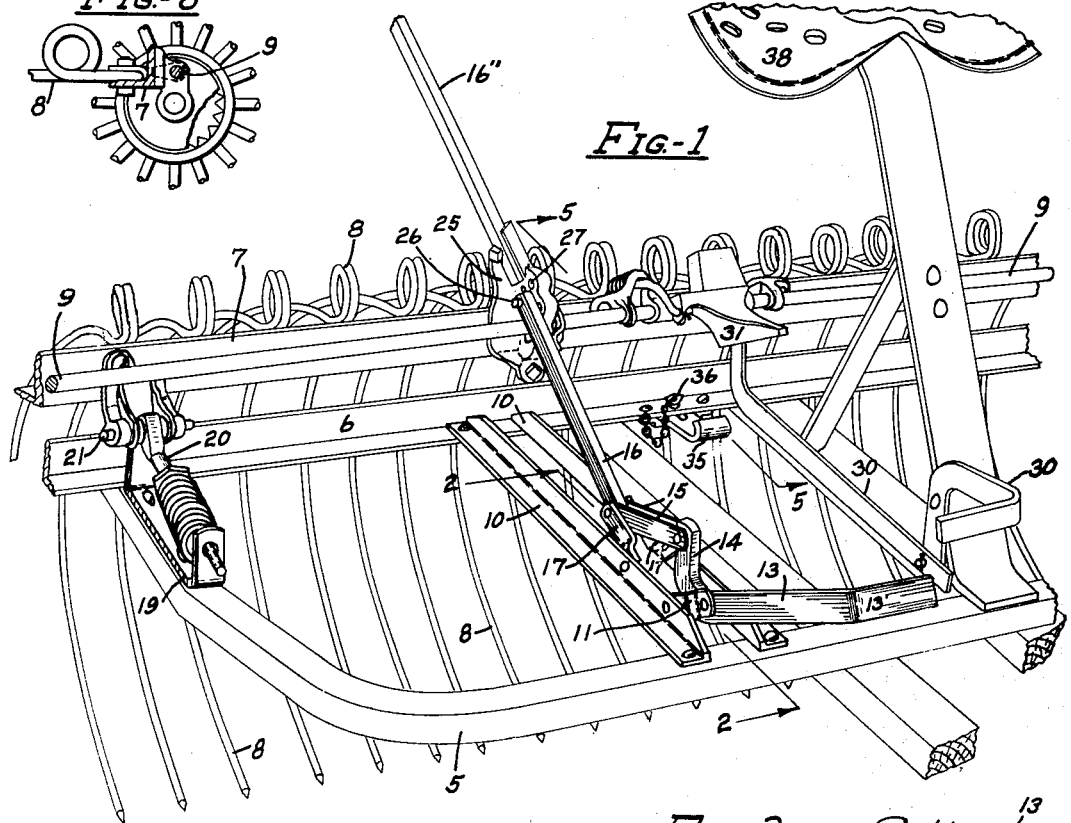
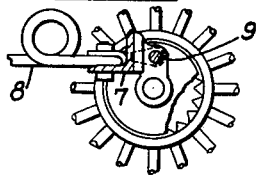
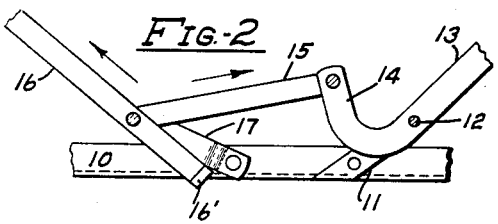
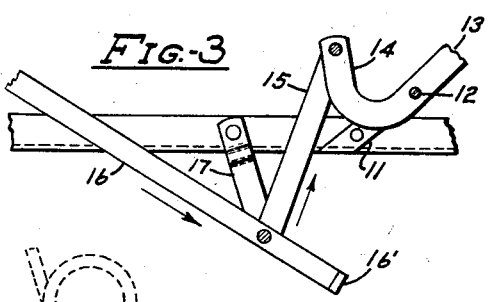
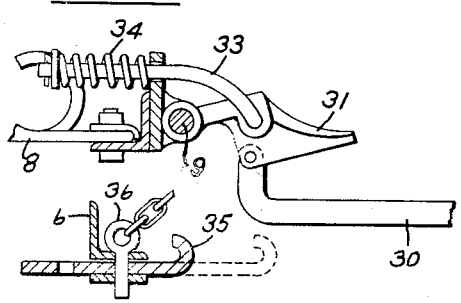
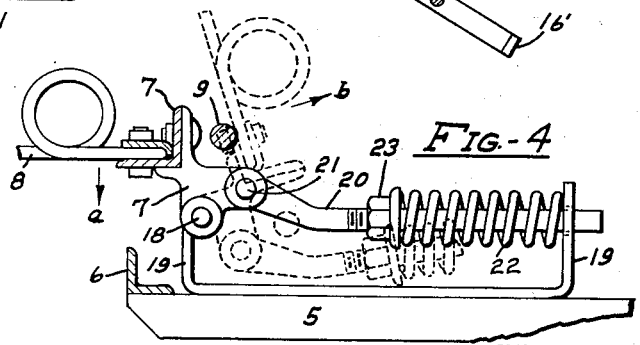
INVENTOR.
ALVAH E. RUTTER
BY James A. Walsh,
ATTORNEY Patented Feb. 20, 1934

1,947,572

UNITED STATES PATENT OFFICE 1,947,572

HAY RAKE

Alvah E. Rutter, Rockford, Ill., assignor to J. I. Case Company, Racine, Wis., a corporation Application February 17, 1933. Serial No. 657,183

5 Claims. (Cl. 56—391)

My invention relates to self-dumping hay rakes embodying an upwardly swinging rake-head for dumping its load by the rotation of its wheels, and consists in certain details of construction and arrangements of parts whereby the operation of such implement is improved and readily controlled by an attendant, as will hereinafter more fully appear.

In the accompanying drawing, forming part hereof, Figure 1 is a fragmentary perspective of a rake embodying my improvements; Figs. 2 and 3, detail sections of lever mechanism for controlling the movements of the rake-head taken on the dotted line 2—2 in Fig. 1; Fig. 4, a detail showing a compression spring and associated parts for speeding the return of the rake to ground working and dumping positions; Fig. 5, a detail of a trip for automatically releasing the rake clutch or pawl mechanism from the carrying wheels when the rake has reached a predetermined height taken on the dotted line 5—5 in Fig. 1; and Fig. 6 is a detail of one of the carrying wheels indicating the hub with ratchet and pawl-shaft.

In said drawing the numerals 5, 6, indicate the draft frame, which may be of any desired construction and arrangement, the usual stripper fingers being omitted, and upon which frame a rake-head 7 having teeth 8 is pivotally mounted, as is common, the rake-head carrying pawl shafts 9 the outer ends of which engage the hubs of the carrying and drive wheels, as shown in Fig. 6, in a manner well known.

In Fig. 1 the rake is shown in raking and loading position, the frame thereof embodying struts 10 to which brace members 11 are fixedly secured, Fig. 2, and pivotally connected, at 12, to a lever 13 having a preferably transverse treadle 13' at its forward end and an upwardly curved rear end 14 connected by suspension links 15 to a presser-bar 16, said links and bar being pivotally secured to links 17 pivotally attached to struts 10. It will be noted that lever 13 is mounted forwardly of the linkage system described for the purpose of reducing to a minimum the travel of said lever, which effectively holds the teeth 8 down in raking condition and also minimizes the possibility of accidents which occur when a lever of considerable length is employed.

In Fig. 1, showing the relation of the linkage members, the teeth 8 are in raking or loading position, and when it is desired to bring the teeth in closer relation to the earth it is but necessary to press the treadle 13', which downward movement, as well as the complete down stroke of the teeth from their raised position, is accelerated by the mechanism shown in detail in Fig. 4. The rake-head 7 is pivotally connected, at 18, to a keeper 19 supported on frame 5, 6, and to which head a spring-controlled push-rod 20 is connected, at 21, the expansion spring 22 on said rod being held between the keeper and an adjustable nut 23 on the rod, the pivotal connection of said rod to the rake-head being above the pivotal connection 18 of the latter. When said rake-head is rotated rearwardly, as will further appear, the pressure of the spring 22 against nut 23 will cause the rod 20 to increase the speed of rotation of the rake-head to rapidly lower the teeth 8 in the direction of the arrow $a$. It will thus be seen that by applying pressure to lever 13 the teeth 8 will be held in raking position without the use of locking means, and in Fig. 2 it will be noted that a stop-block 16' forms a part of bar 16 and by contacting links 17 prevents the bar 16 from coming into longitudinal alignment with the link 17, the upper end of which bar is adjustably connected to the bracket 25 on the rake-head by the pin 26 and a series of holes 27 in said bracket.

When a load has been raked and is ready to be dumped, the treadle 13 is released and the trip-lever 30 depressed, which lever is pivotally connected to a trip-plate 31, Fig. 5, operating the pawl shafts 9, a tension-rod 33 being connected to the plate and yieldingly held in the rake-head by the spring 34. When the lever 30 is tripped, the trip-plate 31 is pulled downwardly, which movement rotates the shafts 9 causing the usual pawls at the ends thereof to engage the rotating wheel-hubs, as is common, to rock the rake-head forwardly and upwardly and thus raise the teeth to dumping position. The limit to which the teeth may be raised is controlled by a snubber 35 adjustably mounted in frame member 6, and preferably held in engagement therewith by a suspended pin 36, which may be removed to adjust the snubber into various positions as indicated by the full and dotted lines in Fig. 5. When in the full line position, the distance between the trip-plate 31 and the snubber 35 provides a wide range of movement of the plate before contacting the snubber so that the rocking rake-head raises the teeth 8 to maximum height, the upward movement of the teeth being accelerated by the push-rod 20, Fig. 4, which imparts downward thrust upon rake-head 7 at its pivotal connection therewith, and so continues until said parts rock in the direction of the arrow $b$ to assume the dotted line position indicated. At the moment of contact between the trip-plate and snubber the shafts 9 cause the pawls to become disengaged from the wheel-hubs in a manner well known, when the teeth are returned to the loading position indicated in Fig. 1, the rearward rocking of the rake-head and downward movement of the teeth being increased by the action of the push-rod 20 as before described. By adjusting the snubber to the dotted line position, Fig. 5, the distance between it and the trip-plate 31 is reduced so that the limit of movement of the raising teeth 8 will be less than when the snubber is in the full line position, and, as will be understood, intermediate adjustments of the snubber may be made to regulate the upward movement of the teeth as desired.

As described, the raising of the rake-teeth is automatically controlled by the pawl shafts and wheel-hubs, but which operation also may be manually performed by the hand-lever 16" under control of an operator on the seat 38, which lever is connected to bracket 25, and upon being forced forwardly and downwardly in the direction of the linkage system the rake-head will be rocked to raise its teeth, in which position the rake-head may be maintained by anchoring the lever when transporting the implement, as is common. The relation of the lever and link system parts when the teeth are held in raking position by foot pressure on the treadle 13', is indicated in Fig. 2, but as the rake-head is rocked to raise the teeth the bar 16 and link 17 will fold downwardly and forwardly to the position indicated in Fig. 3, which action permits the link 15 to pivot about the connection at 14 by the reverse mechanical action of the links and presser-bar. It will be understood, of course, that when hand-lever 16" is not employed for raising the rake-head the simple act of depressing treadle 13' will maintain the head in raised position after the pawl shafts have become disengaged so that said head may be gradually lowered by constantly decreasing pressure on said treadle, and the teeth forced against the earth by increasing such pressure.

I claim as my invention:

1. The combination, with a hay rake, of a frame, wheels having hubs supporting the frame, a toothed rake-head rockingly supported on the frame and having pawl shafts engageable with the hubs, a presser-bar connected to the rake-head, a link connecting the bar to the draft frame, a foot lever connected to said frame, a suspension link connecting the lever to said bar and link whereby the rake-head may be adjusted to raking position by pressure on the lever, a trip-plate on the rake-head, a snubber on the frame adapted to be engaged by the trip-plate, and a trip-lever connected to the trip-plate for engaging the pawl shafts and hubs to rock the rake-head upwardly and forwardly into dumping position and also for engaging said plate with the snubber to release the rake-head from its pawl engagement to be returned to raking position.

2. The combination, with a hay rake, of a frame, wheels having hubs supporting the frame, a toothed rake-head rockingly supported on the frame and having pawl shafts engageable with the hubs, a presser-bar connected to the rake-head, a link connecting the bar to the frame, a foot lever connected to said frame, a suspension link connecting the lever to said bar and link whereby the rake-head may be adjusted to raking position by pressure on the lever, a trip-plate on the rake-head, an adjustable snubber on the frame adapted to be engaged by the trip-plate, a trip-lever connected to the plate for engaging the pawl shafts and hubs to rock the rake-head upwardly and forwardly into dumping position and also for engaging the plate with the snubber to release the rake-head from its pawl engagement to be returned to raking position, and yielding means on the frame comprising a spring-controlled push-rod connected to the rake-head to accelerate its movements into raking and dumping positions while being adjusted.

3. In a hay rake, a frame, wheels having hubs supporting the frame, a rake-head on the frame having pawls engageable with the hubs, a presser-bar connected at one end to the rake-head, means for pivotally connecting the opposite end of the bar to the frame, a foot lever pivotally connected to the frame, a suspension link connecting the pivotal connecting means and bar said means being in substantial horizontal relation to the bar connecting means and bar when pressure is applied to the lever, and a trip-lever connected to the rake-head for engaging the pawl shafts and hubs to adjust the rake-head upwardly into dumping position and during which adjustment the suspension link will occupy a substantially vertical relation to the lever and bar.

4. In a hay rake, a frame, wheels having hubs supporting the frame, a rake-head on the frame having pawls engageable with the hubs, a trip-plate on the rake-head, a snubber on the frame, a trip-lever connected to the plate for engaging the pawl shafts and hubs to adjust the rake-head upwardly into dumping position and also for contacting the trip-plate with the snubber to release the rake-head from engagement with the hubs to be returned to raking position, a linkage system connecting the rake-head and the frame, and a lever connected to the linkage for maintaining the head in raking position.

5. In a rake-head, a draft frame, wheels having hubs supporting the frame, a toothed rake-head on the frame including pawls engageable with the hubs, a trip-plate on the rake-head, a snubber on the frame, a trip-lever connected to the rake-head for engaging the pawl shafts and hubs to adjust the head from raking to dumping positions and for engaging the trip-plate with the snubber to release the head from engagement with the hubs, a foot lever pivotally mounted on the frame, a presser-bar connected to the rake-head, and a suspension link connecting the lever and bar whereby the rake-head may be adjusted to and maintained in raking position by pressure on the lever and rocked to dumping position by releasing the footlever and applying pressure to the trip-lever.

ALVAH E. RUTTER.